Feb. 11, 1936.　　　　B. HARTZ　　　　2,030,632
SEPARATION OF GARLIC AND ONION SEED FROM WHEAT
Filed July 30, 1934　　　3 Sheets-Sheet 1
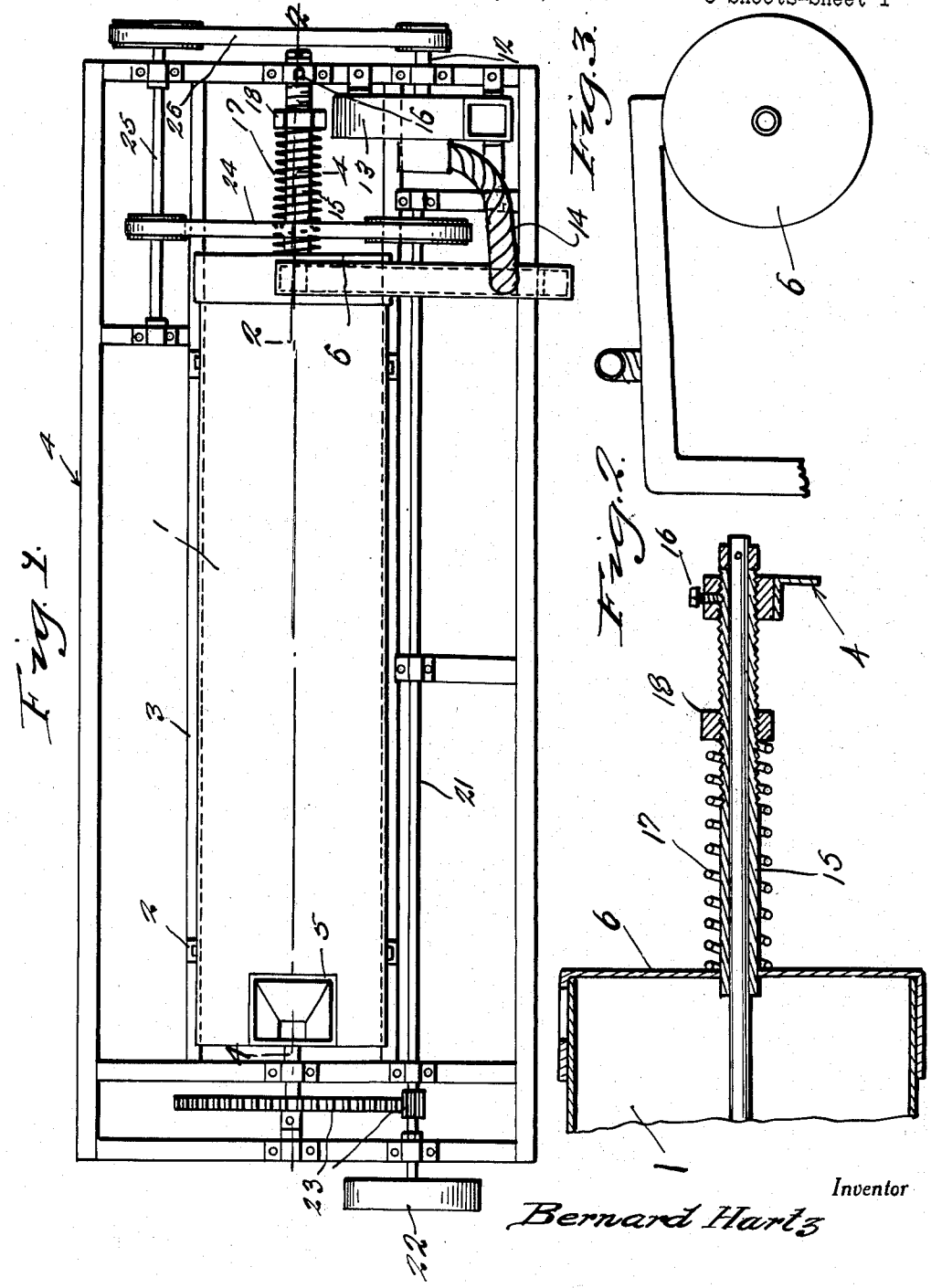
Inventor
Bernard Hartz
By Clarence A. O'Brien
Attorney Feb. 11, 1936.  B. HARTZ  2,030,632
SEPARATION OF GARLIC AND ONION SEED FROM WHEAT
Filed July 30, 1934  3 Sheets-Sheet 2
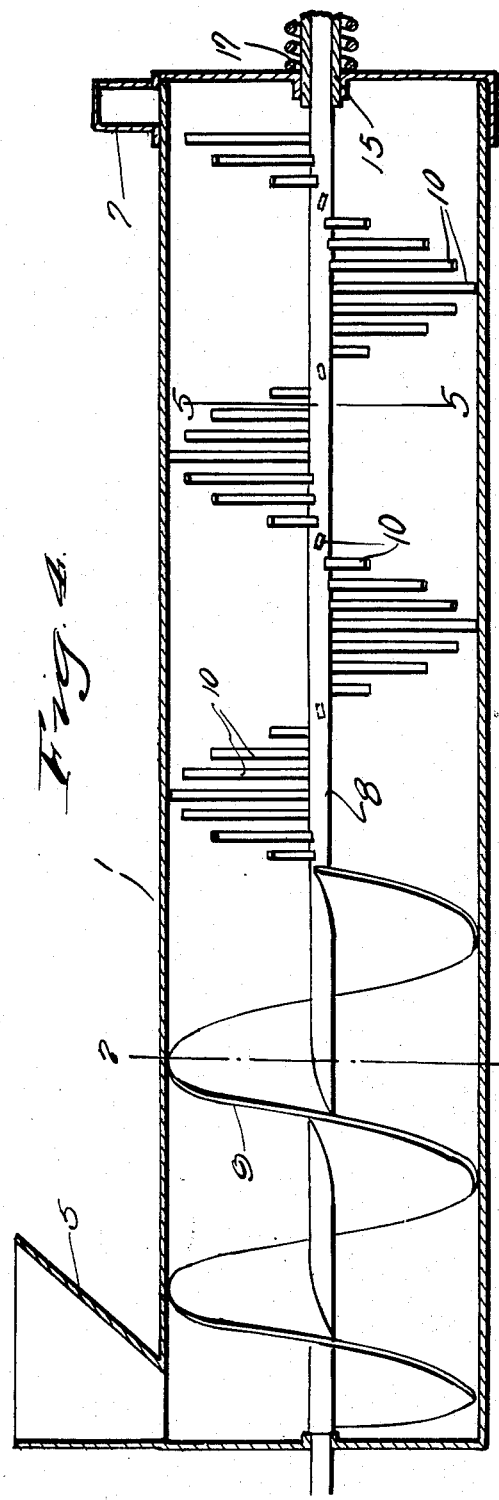
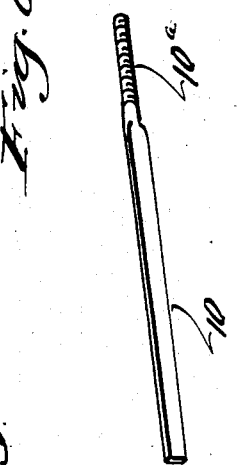
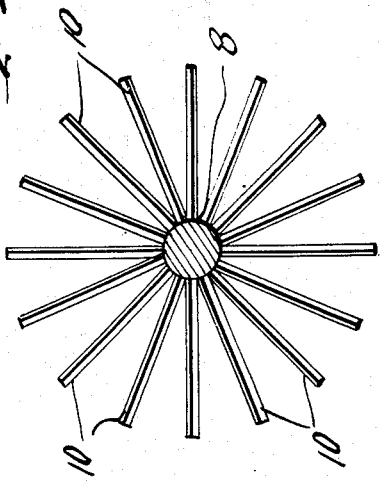
Inventor
Bernard Hartz
By Clarence A. O'Brien
Attorney Feb. 11, 1936. B. HARTZ 2,030,632
SEPARATION OF GARLIC AND ONION SEED FROM WHEAT
Filed July 30, 1934 3 Sheets-Sheet 3
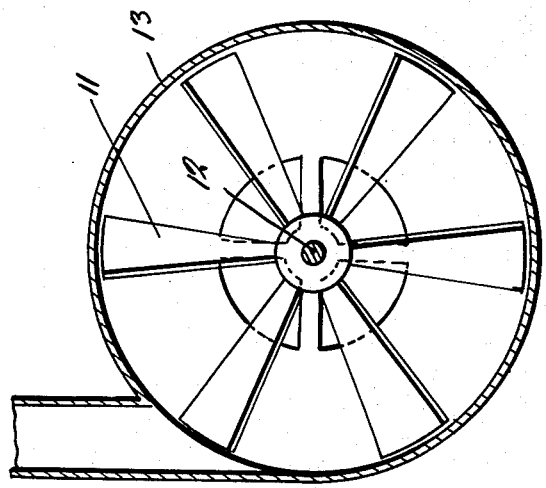
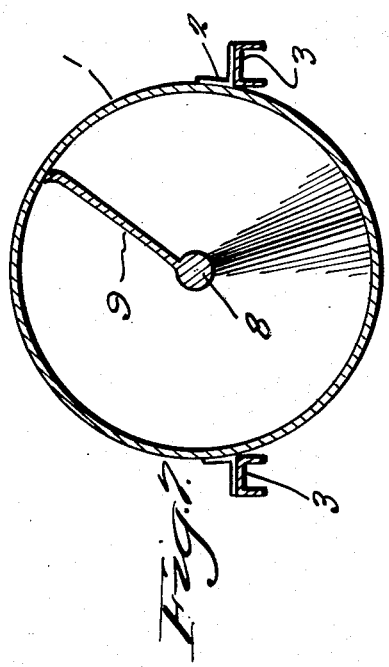
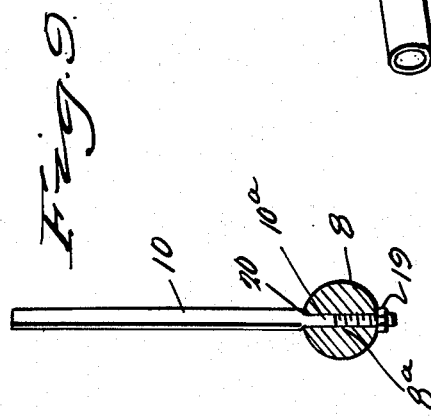
Inventor
Bernard Hartz
By Clarence A. O'Brien
Attorney

UNITED STATES PATENT OFFICE 2,030,632

SEPARATION OF GARLIC AND ONION SEED FROM WHEAT

Bernard Hartz, Chrisney, Ind.

Application July 30, 1934, Serial No. 737,677

1 Claim. (Cl. 209—6)

This invention relates to a new and useful apparatus for separating garlic or onion seed from wheat, wherein the mixed wheat and garlic is subjected to a pressure sufficient to crush the garlic through the medium of the forceful engagement of the wheat grains therewith while a mixture of the wheat and garlic are subject to agitation simultaneously with the pressure above alluded to.

Further in accordance with the present invention a machine or mechanism for the purpose above specified is provided with means for insuring the subjecting of the mixed wheat and garlic to a pressure which will be sufficient to crush the garlic without injury to the wheat, and which at the same time includes means for thoroughly agitating the mixed garlic and wheat while the mixture is being subjected to the pressure alluded to; the apparatus also including efficient means for separating the garlic from the wheat.

The invention together with its objects and advantages will be best understood from a study of the following description, taken in connection with the accompanying drawings wherein:—

Figure 1 is a plan view of an apparatus or machine embodying the features of the present invention.

Figures 2 and 4 are detail views taken on the lines 2—2 and 4—4, respectively, of Figure 1.

Figure 3 is an elevational view of the cap equipped end of the pressure and agitating cylinder.

Figures 5 and 7 are detail views taken substantially on the lines 5—5 and 7—7, respectively, of Figure 4.

Figure 6 is a perspective view of one of the agitating fingers.

Figure 8 is a sectional view through the blower.

Figure 9 is a sectional view through a shaft showing the manner of securing an agitator finger thereto.

Figure 10 is a perspective view of a sleeve hereinafter more fully referred to.

Essentially, and in the preferred embodiment thereof, the invention consists of a cylinder 1 constituting a pressure and agitating chamber, and this cylinder is suitably mounted through the medium of brackets 2 between parallel bars 3 forming a part of a support structure 4, the latter being in the nature of a frame structure as shown. At one end, and at top thereof the cylinder 1 is provided with an inlet mouth 5. At the opposite end thereof the chamber 1 is provided with a spring pressed movable cap 6 having a discharge spout 7 leading from an opening 7' in the top part of the flange of the cap. This spout has a short upstanding portion connected with the cap and a portion of the spout slopes downwardly and outwardly to a depending portion as shown in Figure 2, the depending portion discharging into a suitable receptacle or the like. It will be seen that the spout moves with the cap as will be hereinafter described.

Extending through the chamber or cylinder 1 is a shaft 8 provided at the inlet end of the chamber with a screw conveyor 9 and at the outlet end of the chamber with angularly related series of agitator fingers 10. As is apparent the conveyor 9 will serve to force the mixture of wheat and garlic under pressure toward the cap equipped end of the chamber 1, and in passing from the conveyor 9 the mixture, under pressure, will be acted upon by the fingers 10 while the mixture still under great pressure moves toward the cap equipped end of the cylinder or chamber 1. It will thus be apparent that by providing the screw conveyor 9 and the fingers 10 the mixed wheat and garlic will be subjected to a pressure which will be sufficient to crush the garlic through the medium of the forceful engagement of the wheat grains therewith, while at the same time the mixture of wheat and garlic will be subjected to agitation by the fingers 10 simultaneously with the pressure developed within the cylinder that causes the engagement of the grains of the wheat. As the result a tearing and crushing of the garlic by the engagement therewith of the grains of wheat and the agitation of the mixture by the fingers 10 is effected. In this connection it will be noted that the pressure developed as aforementioned, and the agitation obtained by the fingers 10 while amply sufficient for the purpose intended will in nowise result in a tearing, crushing or cracking of the wheat, but at the same time a thorough separation, tearing and crushing of the garlic will be effected.

The aforementioned shaft 8 is journaled in suitable bearings provided therefor on the supporting structure 4, and one end portion of the shaft 8 extends through a sleeve 15 that is anchored against longitudinal movement in any suitable manner and as indicated generally as 16. A spring 17 is disposed between the cap 6 and a spring tensioning nut 18 screwed on to one end of the sleeve 15. As is apparent the wheat and garlic in the cylinder 1 are engaged by the conveyor screw blade 9 and moved through the cylinder to and against the cap 6. The pressure of the spring 17 is so adjusted so as to obtain a pressure, as before mentioned, sufficient to crush the garlic without crushing or bruising the kernels of wheat.

A fan casing 13 is supported by the frame and contains a fan 11 which is mounted on a shaft 12 journalled in the frame and a flexible tube 14 connects the inlet of the fan casing with the intermediate portion of the sloping part of the discharge spout 7 as shown in Figures 1 and 3. Thus it will be seen that the wheat and garlic will be held in the cylinder until sufficient pressure occurs to force the cap 6 outwardly a sufficient distance to cause the port 7' in the flange of the cap to pass beyond the end of the cylinder. When this occurs the wheat and the crushed garlic will be forced through the port into the spout 7 and when the mixture passes under the tube 14 the suction produced in the tube by the fan will draw the crushed garlic from the spout into the tube and the wheat will continue down the spout to the point of discharge. Thus the garlic particles will be separated from the wheat.

As will be clear from a study of Figures 6 and 9 each agitator finger 10, which may be formed of steel or iron, is substantially rectangular in cross section and is provided at one end with a threaded shank 10a that is passed through a suitable opening 8a provided therefor in the shaft 8, the finger being secured by a nut 19 screwed on to the shank 19a and cooperating with a shoulder 20 provided at the junction of the finger 10 and its shank 19a. In this connection it will be noted that the body of each finger 10 is twisted slightly relative to its shank 10a so as not to present a wholly flat surface to the mixture of wheat and garlic as each finger passes through the mixture. As a result a thorough agitation of the mixture will be accomplished without tearing, crushing or otherwise injuring the wheat kernels.

For driving the shaft 8 there is provided a power shaft 21 suitably mounted on the supporting structure 4 and equipped at one end with a pulley 22 for receiving power from a motor or other suitable prime mover. The shaft 8 is driven from the shaft 21 through the medium of a suitable gearing 23. For driving the fan shaft 12 there is provided a belt and pulley drive connection 24 between the shaft 21 and a countershaft 25 and a second belt and pulley drive connection 26 between the countershaft 25 and the shaft 12.

What is claimed is:—

An apparatus for separating garlic and the like from grains comprising a horizontally arranged cylinder, means for introducing the material into one end of the cylinder, a shaft extending longitudinally through the cylinder, a screw conveyor carried by the shaft and located in the front portion of the cylinder, a series of agitating fingers carried by the shaft and located in the remainder portion of the cylinder, said fingers extending from the shaft to a point close to the inner circumference of the cylinder and spirally arranged on the shaft, a cap closing the outlet end of the cylinder and movably arranged thereon, adjustable spring means for resisting outward movement of the cap, the cap having a discharge port on the top part of the flange which is closed by a portion of the discharge end of the cylinder when the cap is in normal position and which moves beyond said portion of the cylinder when the cap is forced outwardly against the pressure of the spring means, a discharge tube having one end connected with the cap and receiving material passing through the port, a suction producing device and a flexible conduit connecting the inlet of said device with a top part of the chute, and means for rotating the shaft.

BERNARD HARTZ.